United States Patent [19]

Mátyás et al.

[11] 3,846,567

[45] Nov. 5, 1974

[54] VEGETABLE PRODUCT COATED WITH PROPIONIC ACID IMPREGNATED PARTICULATE MATERIAL

[75] Inventors: Jakab Mátyás; István Petroczy; Eva Somfai; Agoston Dávid, all of Budapest, Hungary

[73] Assignee: Chinoin Gyogyszer es Vegyeszeti Termekek Gyara Rt., Budapest, Hungary

[22] Filed: Jan. 27, 1972

[21] Appl. No.: 221,376

[30] Foreign Application Priority Data

Jan. 27, 1971  Hungary .......................... MA 2188

[52] U.S. Cl.................. 426/289, 426/321, 426/377
[51] Int. Cl........................................... B65b 55/009
[58] Field of Search ............ 99/150, 190, 153, 157, 99/154, 100; 34/9; 260/540; 426/289

[56] References Cited
UNITED STATES PATENTS

| | | | |
|---|---|---|---|
| 1,668,464 | 5/1928 | Pease | 71/24 |
| 2,760,866 | 8/1956 | Nielsen | 99/2 |
| 3,404,987 | 10/1968 | Kooistra | 99/154 |
| 3,449,108 | 6/1969 | McConnell | 99/153 |
| 3,591,515 | 7/1971 | Lovely | 99/154 |
| 3,692,534 | 9/1972 | Veno | 99/150 R |

*Primary Examiner*—Norman Yudkoff
*Assistant Examiner*—Hiram H. Bernstein
*Attorney, Agent, or Firm*—Karl F. Ross; Herbert Dubno

[57] ABSTRACT

A preservative for organic substances comprises a powdery mixture of organic carboxylic acid, especially propionic acid, and a solid dispergent having a particle size below 10 microns such that the liquide constitutes 50 to 90 percent of the mixture and is adsorbent upon solid. The powder may be brought into direct contact with, for example, vegetable matter to be treated.

5 Claims, 2 Drawing Figures

VEGETABLE PRODUCT COATED WITH PROPIONIC ACID IMPREGNATED PARTICULATE MATERIAL

FIELD OF THE INVENTION

This invention relates to products appearing as solid powders, to a process for their preparation from liquids, especially from liquids of erodent character and a conservation method using the powder products.

SUMMARY OF THE INVENTION

According to the process of the present invention liquids, especially erodent liquids, are transformed into solid powder by adsorbing the liquid on the surface of a highly dispersed solid substance having a large surface area. In other words the liquid and a solid substance of small particle size — preferably a powder, the "dispergent" — are converted into a mixture having a high degree of dispersity.

The powder products according to the invention comprise 50-95 percent, preferably 55-80 percent, of a liquid substance and 5-55 percent of a dispergent.

The term "surface" as used throughout the application relates both to the adsorptive internal and external areas of the porous dispergent material. The term "erodent liquids" indicates such chemical substances as are liquid at ambient temperature which exhibit tissue-damaging, wound-inducing or vesicant effect when splashed into the eye or contacted with living tissues. Substances of the above type are generally also strongly corrosive, their transport, storage and use causing serious problems of safety and corrosion.

According to the present invention concentrated organic or inorganic acids and bases or derivatives thereof are transformed into powders.

As adsorbents oxides, activated charcoal, perlite, plastic powders, bentonite or peat, may be used.

Particularly suitable substances having large adsorbent surface areas are silicon dioxide polymers, aluminum oxides, silicates, aluminates and mixtures thereof. The dispergent may be amorphous or microcrystalline as determined by X-ray diffraction analysis. Hydrophobic or hydrophilic dispergents can be used. Depending on the application of the obtained product, one may use silicon dioxide polymers prepared by flame hydrolysis or precipitation or silica of mineral origin. The latter substance may be subjected to purification, ignition, grinding, screening or sizing prior to use.

According to the present invention powders, which can be significantly more safely handled and easily stored than the corresponding liquid may be prepared from concentrated sulfuric acid, hydrochloric acid, nitric acid, liquid phosphoric acids, acid chlorides, organic carboxylic acids, e.g., aliphatic carboxylic acids which are erodent in concentrated solutions, such as concentrated formic acid, acetic acid, propionic acid, chloracetic acids and bromoacetic acids.

Adsorption may be carried out by admixing the adsorbent and the liquid with strong stirring. The ratio of the liquid and the adsorbent is such that the powder obtained contains 5-45 percent of the adsorbent or solid phase.

The selection of the carrier or solid phase depends on the nature of the fluid. It must be carefully taken into consideration that the carrier used should be substantially inert to the erodent liquid.

Preferably carrier powders having a particle-size or diameter below 10 microns are used.

The present invention also includes powder products which comprise as adsorbed fluids chemical compounds having normally a vapor pressure of 10-100 Hg mm at ambient temperature. In the powder according to the invention the vapor pressure of the adsorbed substance increases by about one order of magnitude. Owing to this property some of the powders according to the present invention can be used for treatments in the gaseous phase by exposing something to the powder for treating same with the vapors of the adsorbed fluid. In order to carry out a treatment of this type one may proceed by mixing the powder product with the product to be treated or by applying the powder in layers between layers of the product subject to treatment. Due to the increased vapor pressure a considerable amount of the adsorbed liquid evaporates in a short time, thus providing the gas concentration required for the treatment. The process is suitable for wide-spread application where the application of the liquid per se encounters problems, for example, of disinfection, disinsection and impregnation and the like, especially at locations which are difficult to reach or when the higher temperature required for evaporation of the liquid would damage the environment.

The present invention is of considerable importance in agriculture.

Propionic acid has been recently used in agricultural plants for the inhibition of microbiological decomposition, particularly for the preservation of corn fodder. Liquid propionic acid, when sprayed onto the surface of granular corn fodder during ensilage or after harvesting inhibits microbiological procedures, preventing a rise of temperature and the deterioration, heating and ignition of the fodder (/see e.g. Ernahrungsdienst 25, 34 /1970/).

The drawback of the treatment of fodder with liquid propionic acid resides in the fact that the propionic acid is an erodent corrosive liquid and thus its transport to the agricultural plants often encounters difficulties. Moreover the propionic acid must be sprayed onto the fodder with utmost care by means of a special process with the aid of an apparatus having numerous parts. The above disadvantages has discontituted a bar to the general use of this preservation process. Propionic acid can be only transported in special containers lined with polyethylene and transport is dangerous even in this case, since the polyethylene lining is corroded by propionic acid within a relatively short time. Polyethylene drums are not applicable for the purpose.

A further disadvantage is that the distribution of propionic acid sprayed onto the grain is not entirely uniform; certain parts of the grain mass receive more propionic acid, while no liquid propionic acid reaches to the surface of grains in contact with other grains. The preservation of grain having a moisture content below 18 percent can be hardly accomplished.

Propionic acid in powder form according to the present invention is highly suitable for grain treatment. Propionic acid can be applied to oxides, activated charcoal, bentonite, turf, preferably silica, alumina, silicates, aluminates or mixtures or combinations thereof, by means of simple mixing and kneading methods. The above dispergents may amorphous or microcrystalline characteristics when exposed to X-rays.

According to a further embodiment of the present invention a process for the inhibition of microbiological decomposition of vegetable or animal products, which comprises increasing the vapor pressure of propionic acid by transfering the latter into a propionic acid powder and subjecting the vegetable or animal product to be preserved to the effect of gaseous propionic acid by treating same with propionic acid powder at ambient temperature. One may proceed preferably by applying to or mixing propionic acid powder with the product to be preserved in a ratio so that the preserved product contains 0.1–3 percent propionic acid.

A highly active propionic acid powder which is easy to use for the above purpose comprises a combination of hydrophobic and hydrophilic adsorbents as carrier. A combination of hydrophobic and hydrophilic silicon dioxide polymer has proved to be particularly preferable.

The bacteriostatic and fungistatic effect of propionic acid powder is sometimes higher than that of propionic acid. Treatment with gaseous propionic acid requires a smaller amount of propionic acid or for the same quantity of propionic acid, the preserving effect is maintained for longer periods.

The preservation process may be used in various fields of application. One of the most important uses is its application to corn fodder. Thus, among others, the following products may be readily preserved by means of the process according to the present invention: maize, oat, wheat fodder, barley, rice, fodder pea, fodder bean, oil-containing grains, such as soya-bean, sunflower-seed, peanut, grape-seed, cotton-seed, palm-seed, and sesame-seed, broomcorn, copra. Said cereal grains may also be subjected to preservation in ground form. The process is also suitable for the preservation of green fodder plants, such as lucerne, clover, maize for silage, etc.

The powdery products of the present invention may be prepared on large laboratory or industrial scale, preferably by continuous or batch-wise admixture of the liquid and the adsorbent having a large surface area in a vertical or horizontal kneading machine, homogenizer, semifluid-bed or fluid-bed mixing-machine. The selection of the mixing apparatus and the character of the substances to be mixed determines whether the powdery adsorbent or the liquid is first introduced into the machine or both components are introduced in parallel.

SPECIFIC EXAMPLES

Figure 1:
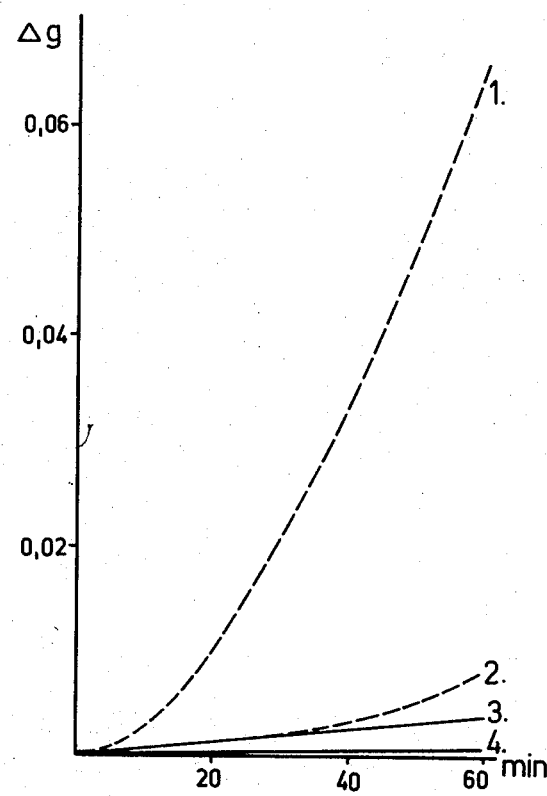
FIGS. 1 and 2 are graphs representing results of the following Examples.
Figure 2:
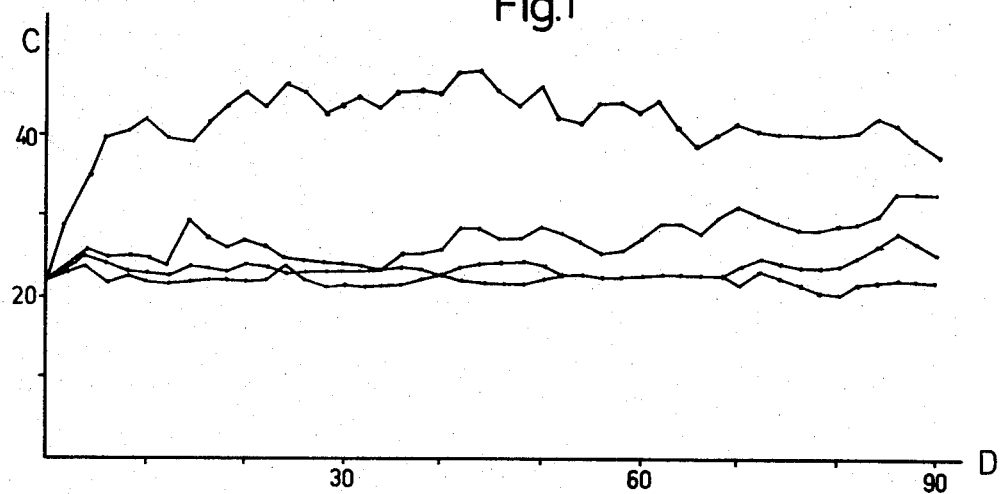

Further details of our invention are to be found in the following Examples. Experimental data showing the increase of vapor pressure are presented using propionic acid as a model substance.

Examples 1. 77.2 g of concentrated sulfuric acid are admixed with 22.8 g of a hydrophilous X-ray-amorphous silica polymer having a BET-surface of 200 m$^2$, e.g., Aerosil 200, by adding the powdered adsorbent to the liquid in small portions: 100 g of a product having a loose powder structure are obtained.

2. The process according to Example 1 is carried out except that 75 g of 62 percent nitric acid are used. 100 g of a loose powder are obtained which corresponds to 46.5 g of nitric acid.

3. 76.4 g of 37 percent concentrated hydrochloric acid are treated with 23.6 g of silica polymer as disclosed in the preceding examples. 100 g of a loose powder are obtained which contains 28.3 percent of pure hydrochloric acid.

4. 75 kg of propionic acid are introduced into a 200 l 3-armed kneading machine, the mixer is switched on and 20 kg of hydrophilous X-ray-amorphous silica, e.g., a product having the trade name Sipernat S-22, are added at room temperature in several portions. 5 kg of hydrophobic X-ray-amorphous silica, e.g., a product designated as D-17, are then added. A powdery product is obtained which contains 75 percent of pure propionic acid. The product can be stored in polyethylene bags for long periods of time and is useful as preserving agent.

5. 25 kg of hydrophilous X-ray-amorphous silica, e.g., a product designated as S-22, are placed into a vertical kneading machine and 70 kg of propionic acid are continuously introduced into the system through a nozzle under stirring. Thereafter 5 kg of hydrophobic X-ray-amorphous silica, e.g., a product designated as D-17, are added continuously under stirring. A loose powdery product is obtained, which can be readily stored in polyethylene bags and contains 70 percent of propionic acid.

6. Into a semifluid-bed continuously operating mixing apparatus 70 kg of propionic acid and 30 kg of purified finely ground microcrystalline pretreated silica of mineral origin are continuously introduced. A powdery product is continuously formed which is collected in paper bags lined with polyethylene. The product can be safely stored in said bags during transport.

7. According to the process described in the preceding Examples stable powders easy to handle are prepared by admixing the following components:

a. 20 g of propionic acid + 6.2–6.4 g of hydrophobic silica polymer, Aerosil R–972;

b. 20 g of propionic acid + 4.9–5.2 g of hydrophilous silica polymer, Aerosil 200;

c. 20 g of propionic acid are homogenized with a silica polymer, Aerosil 200, whereupon the propionic acid gel thus obtained is homogenized with 2 g silica polymer, Aerosil R–972, being added in small portions. The propionic acid content of the loose powder thus obtained amounts to 80.3 percent;

d. 20 g of propionic acid + 7.3–7.6 g of silica polymer, designated as Sipernat K–33;

e. 20 g of propionic acid + 3.5 g of silica polymer, Sipernat K–322, said mixture being combined with 3.5 g of silica polymer, Aerosil R–972, as described under (c). A powdery product having suitable properties is obtained;

f. 20 g of propionic acid are homogenized first with 2.5 g of hydrophilous silica polymer, Aerosil 200, and then with 2 g of hydrophobic silica polymer, Aerosil R–972, under stirring at 30°C. After 2 hours a powder containing 75.4 percent of propionic acid is obtained;

g. The process according to (f) is carried out except that homogenization is effected at 18°C for 15 hours. The propionic acid content of the powder thus obtained amounts to 80.3 percent.

8. Thermoanalytical investigation of propionic acid powder was carried out with a derivatograph. Samples weighing about 400 mg were used and the heating speed amounted to 3°C/minute. The derivatogram is demonstrated on the figure. It has been found that the propionic acid content of the dispersion quantitatively evaporated until the peak-temperature of 120°-125°C shown by the DTA and DTG curves. In each experiment loss of weight practically began already at 25°C. This shows that the thermochemical properties of propionic acid have changed in the investigated dispersion. This is confirmed by a comparative experiment carried out at 22°C wherein the change in weight was measured gravimetrically as a function of time.

A round glass dish, diameter 26 mm, was suspended on an analytic balance so that the investigated substance hanged from one of the balance arms into a closed space placed under the balance table. The measurement was carried out in open space and in a 5 l closed space. Liquid propionic acid was used in samples weighing about 1 g, while propionic acid powder was weighed in as samples of about 1.5 g. The loss of weight, in g, is plotted on the figure as a function of time, in minutes.

It appears from said data that from the dispersion prepared with the aid of the silicium dioxide derivative (1) 8 times more propionic acid evaporated during 1 hour than from the free acid (2) in open space ( - - - - ). From the dispersion (3) during 1 hour 12 times more propionic acid evaporated than from the free acid (4) in closed space (—). On the basis of the aforesaid it can be stated that due to the distribution in gaseous phase the use of propionic acid powder is more advantageous.

The distribution of propionic acid and the diffusivity thereof was determined on maize samples filled into a glass cylinder. The purpose of the investigation was on the one hand to determine the diffusivity of vapour-phase propionic acid and on the other to draw quantitative conclusions from the propionic acid concentration in the boundary layers — possibly being above the saturated concentration — to details of transport, adsorption and absorption.

Diffusivity was determined at 20°C on 45 g of maize; moisture content 10.7 percent, being disposed in layers onto 0.5 g of propionic acid powder placed in glass cylinders having a diameter of 26 mm. From the 13 (±0.5) cm high maize column (volume about 75 ml) three layers of identical size, upper layer A; central layer B; lower layer C, were separated, propionic acid was eluted with methanol and determined with a 0.1 N sodium hydroxide solution in the presence of phenolphtaleine as indicator. The mean values obtained from three parallel determinations are shown in the following table:

Propionic acid in mg on the maize layers

| Hours | 1 | 3 | 5 | 10 | 24 | 48 |
|---|---|---|---|---|---|---|
| Layer A | 10.47 | 10.49 | 11.26 | 13.19 | 29.96 | 30.24 |
| B | 12.00 | 13.19 | 13.58 | 15.52 | 31.29 | 33.62 |
| C | 12.82 | 13.35 | 15.52 | 24.82 | 34.53 | 35.20 |

At 20°C the tension of propionic acid amounts to 52 Hg mm; this means that gas diffusion alone could not provide more than a few mg of propionic acid in the boundary layers. Since in the upper layer already in the first hour a manifold amount of propionic acid can be detected, gas-diffusion is accompanied by simultaneous adsorption and absorption.

Under such experimental conditions no diffusivity can be calculated. It can be stated that the effective amount of propionic acid was absorbed on the surface of maize during about 16 hours under simultaneous adsorption.

9. The results of a preservation experiment carried out by using propionic acid powder and maize (water content 35±1 percent) is illustrated in the figure. Maize treated with propionic acid powder was kept in closed space at room temperature for 90 days in wood barrels lined with polyethylene.

The changes of the stored maize were indicated with a thermometer (accuracy of the reading 0.2°C). The following samples were used for the sake of comparison:

I = untreated maize controll;
II = maize sprayed with liquid propionic acid;
III = maize treated with propionic acid powder containing the same amount of propionic acid as under II;
IV = maize treated with propionic acid powder containing by 30 percent less propionic acid.

The change in temperature of the four samples was plotted as a function of time. It can be stated that the controll ignited within a relatively short time. Samples treated with propionic acid powder showed in every test more favourable changes in temperature than those treated with liquid propionic acid.

On the basis of our preliminary measurements the required amount of propionic acid which depends on the moisture content of the grain to be treated and the storing period, in months, may be calculated with the aid of the following formula:

$$P = (a.W-b).t + (c.W-d)$$

in which formula
$P$ is the amount of propionic acid (in percent)
$W$ is the moisture content of grain (in percent)
$t$ is the storing period (in months)
$a$, $b$, $c$ and $d$ are constants having the following values:
$a = 0.0021$, $b = 0.02$, $c = 0.0445$, $d = 0.53$.

On the basis of the above formula the required amount of propionic acid may be calculated for grains having a moisture content of 12–45 percent. The propionic acid powder is disposed in layers onto the grain when putting same into the granary.

What we claim is:
1. A process for treating a vegetable product with vapors of propionic acid having a vapor pressure of 10 to 100 mm Hg at ambient temperature, comprising the steps of:
   a. intimately mixing the propionic acid with a finely divided particulate solid selected from the group which consists of dispergent oxides, activated charcoal, perlite, plastic powders, bentonite or peat amorphous or microcrystalline to X-rays and of a particle size under 10 microns to produce a powder containing 50 to 95 percent of the propionic acid; and b. contacting said vegetable product with said powder.

2. The process defined in claim 1 wherein said solid is hydrophobic or hydrophilic silicon dioxide, aluminum oxide, silicates, aluminates, or mixtures thereof.

3. The process defined in claim 2 wherein said powder is contacted with said vegetable product in an amount equivalent to 0.1 to 3 percent propionic acid.

4. The process defined in claim 3 wherein said solid is composed at least in part of silicon dioxide and said powder contains 55 to 80 percent propionic acid.

5. The process defined in claim 4 wherein said solid is a mixture of hydrophobic and hydrophilic silicon dioxide.

* * * * *